US010527906B2

United States Patent
Poulton et al.

(10) Patent No.: US 10,527,906 B2
(45) Date of Patent: Jan. 7, 2020

(54) THERMAL PHASE SHIFTERS FOR OPTICAL PHASED ARRAYS

(71) Applicant: ANALOG PHOTONICS LLC, Boston, MA (US)

(72) Inventors: Christopher Poulton, Cambridge, MA (US); Michael Watts, Hingham, MA (US); Ehsan Hosseini, Boston, MA (US); Erman Timurdogan, Somerville, MA (US)

(73) Assignee: Analog Photonics LLC, Boston, MA (US)

( * ) Notice: Subject to any disclaimer, the term of this patent is extended or adjusted under 35 U.S.C. 154(b) by 0 days.

(21) Appl. No.: 15/883,012

(22) Filed: Jan. 29, 2018

(65) Prior Publication Data

US 2018/0217472 A1 Aug. 2, 2018

Related U.S. Application Data

(60) Provisional application No. 62/451,139, filed on Jan. 27, 2017.

(51) Int. Cl.
*G02F 1/295* (2006.01)
*G02F 1/025* (2006.01)
*G02F 1/01* (2006.01)

(52) U.S. Cl.
CPC .......... *G02F 1/2955* (2013.01); *G02F 1/0147* (2013.01)

(58) Field of Classification Search
None
See application file for complete search history.

(56) References Cited

U.S. PATENT DOCUMENTS

| | | | | |
|---|---|---|---|---|
| 6,031,957 A * | 2/2000 | Suzuki | .............. | G02F 1/011 385/123 |
| 7,333,679 B2 * | 2/2008 | Takahashi | .............. | G02F 1/011 385/1 |
| 7,565,038 B2 * | 7/2009 | Earnshaw | .............. | G02F 1/0147 385/1 |
| 2009/0148095 A1 * | 6/2009 | Pesetski | .............. | B82Y 20/00 385/3 |
| 2014/0376001 A1 * | 12/2014 | Swanson | .............. | A61B 5/0066 356/479 |
| 2016/0334648 A1 * | 11/2016 | Lu | .............. | G02F 1/0147 |
| 2017/0023736 A1 * | 1/2017 | Bauters | .............. | G02B 6/12033 |

OTHER PUBLICATIONS

Maru et al. "Dynamic Gain Equalizer Using Proposed Adjustment Procedure for Thermooptic Phase Shifters Under the Influence of Thermal Crosstalk", Journal of Lightwave Technology, vol. 22, No. 6, Jun. 2004, pp. 1523-1532. (Year: 2004).*

* cited by examiner

*Primary Examiner* — Michelle R Connelly
(74) *Attorney, Agent, or Firm* — Young Basile Hanlon & MacFarlane, P.C.

(57) ABSTRACT

Aspects of the present disclosure describe photonic integrated circuits on a common substrate including an optical phased array having a plurality of emitters and a plurality of thermal phase shifters in which the thermal phase shifters are thermally isolated from one another through the effect of one or more trenches formed over and/or under and/or around the thermal phase shifters and/or waveguides including same.

25 Claims, 11 Drawing Sheets

THERMAL PHASE SHIFTERS FOR OPTICAL PHASED ARRAYS

CROSS REFERENCE TO RELATED APPLICATIONS

This application claims the benefit of U.S. Provisional Patent Application Ser. No. 62/451,139 filed 27 Jan. 2017 which is incorporated by reference as if set forth at length herein.

TECHNICAL FIELD

This disclosure relates generally to beam steering of light and more particularly to large scale optical phased arrays (OPA) that steer coherent light.

BACKGROUND

Recent advancements in silicon photonics fabrication technologies has precipitated the development of nanophotonic optical phased arrays that have proven useful in a number of contemporary applications including light detection and ranging (LiDAR), free space communications and holographic displays. Given their utility, further development and/or improvement of nanophotonic optical phased arrays would represent a welcome addition to the art.

SUMMARY

An advance in the art is made according to aspects of the present disclosure directed to photonic integrated circuits including optical phased arrays comprising a plurality of array elements, each individual one of the plurality of array elements including a phase shifter and an emitter, wherein the plurality of phase shifters are thermally isolated from one another through the effect of an air gap resulting from one or more trenches formed therebetween.

In sharp contrast to prior art phased arrays employing phase shifters, structures according to the present disclosure advantageously mitigate thermal crosstalk between and power consumption of phase shifters which has plagued the prior art.

BRIEF DESCRIPTION OF THE DRAWING

A more complete understanding of the present disclosure may be realized by reference to the accompanying drawing in which:

FIG. 5(A) and FIG. 5(B) are schematic diagrams showing illustrative phased array and thermal phase shifter architectures having: FIG. 5(A)—one trench; and FIG. 5(B)—multiple trenches; formed under and/or around thermal phase shifters according to aspects of the present disclosure;

FIG. 5(C), FIG. 5(D) and FIG. 5(E) are schematic diagrams showing illustrative phased array and thermal phase shifter architectures having: FIG. 5(C)—one trench for phase shifters and one trench for emitters; and FIG. 5(D)—multiple trenches for phase shifters and multiple trenches for emitters; and FIG. 5(E)—a single trench for both phase shifters and emitters; formed under and/or around emitter elements of the antenna array according to aspects of the present disclosure;

FIG. 6(A) and FIG. 6(B) are schematic diagrams showing illustrative phased array and thermal phase shifter architectures including: FIG. 6(A)—electrical contacts on a side of a waveguide outside of a trench; and FIG. 6(B)—thermal simulation of single suspended waveguide showing heat confined in the center region; according to aspects of the present disclosure;

FIG. 8(A), FIG. 8(B), and FIG. 8(C) are schematic diagrams showing illustrative scenarios of how a trench interacts with oxide around waveguides for: FIG. 8(A)—fully suspended waveguides; FIG. 8(B)—top oxide etched; and FIG. 8(C)—waveguides with oxide pedestals; according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Figure 1:
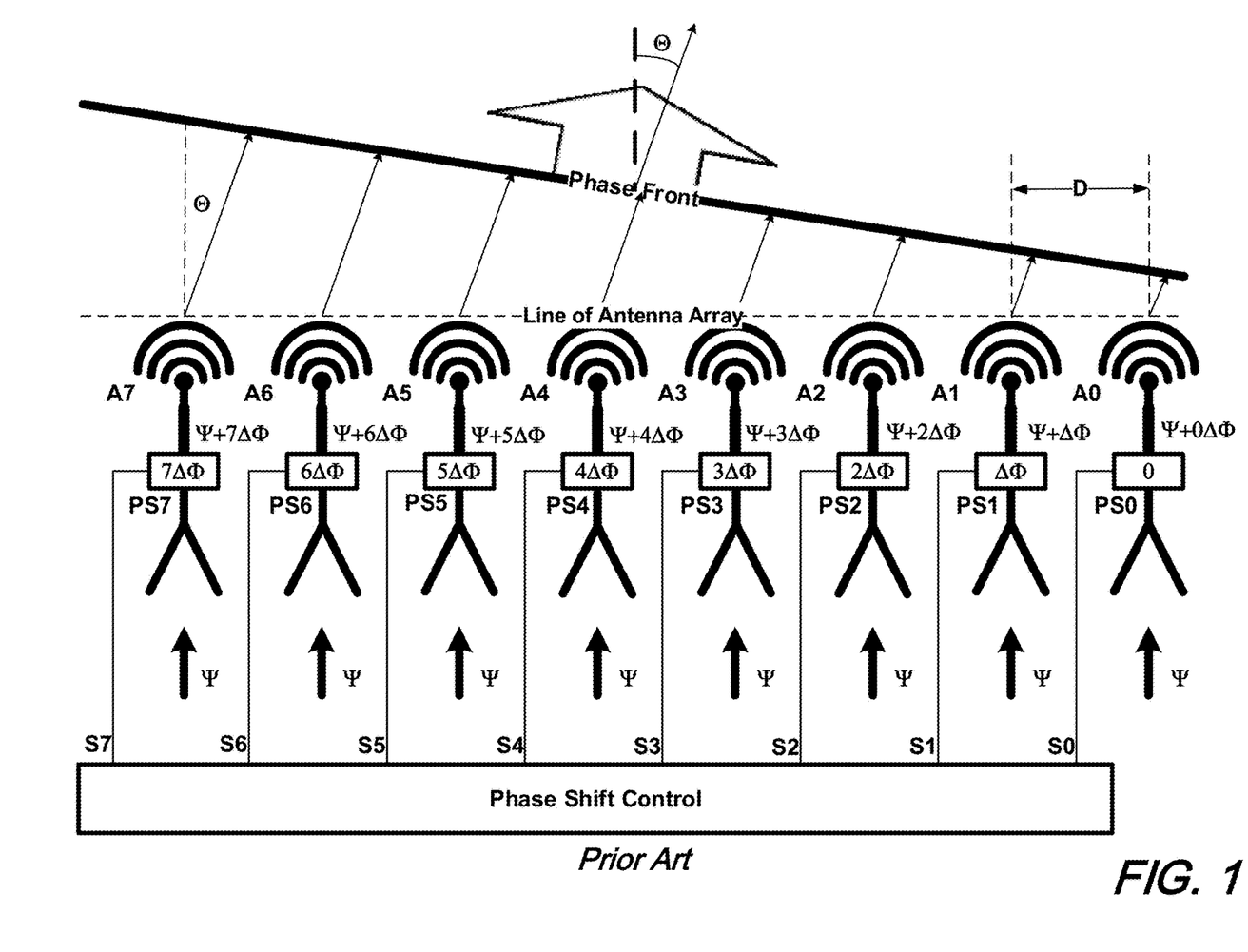
FIG. 1 is a schematic illustrating a prior-art phased array arrangement.

By way of some further background—and with specific reference to FIG. 1—showing a prior art phased array antenna arrangement illustrating beam steering—we begin by noting that a phased array is an array of antennae grouped together to form a single antenna. A beam produced by the phased array antenna may be steered—without physically moving the antenna—by adjusting phase(s) of signals applied to the individual antennae.

As depicted in FIG. 1 a number of substantially identical antennae elements (A0, . . . A7) are arranged into a regular, one dimensional array (could also be 2D) and spaced a distance D, apart from one another. We note that while we have illustratively shown the spaced apart distance as a uniform D, such distance could be aperiodic. A source of electromagnetic radiation having an initial phase of Ψ (this could be linear . . . first element is ΔΨ, second is 2ΔΨ, etc.,)—not specifically shown—is directed separately to a phase shifter element (PS0, . . . PS7) each individually associated with a respective antennae element. A phase shift control unit provides separate phase shift control signals (S0, . . . S7) to each phase shifter element, respectively. Each of the phase shifter elements causes a phase shift to the electromagnetic radiation passing through it, depending upon its respective phase shift control signal such that the phase of the radiation arriving at an antennae element is shifted by a particular amount. As depicted in the figure, the phase difference between radiation emerging from adjacent phase shifter elements is made to vary by a constant amount—if we are creating a plane wave—by appropriate differences in the phase shift control signals. This results in a progression in the phases across the array with the radiation from each antennae element lagging behind the corresponding radiation from the next antennae element such that the radiation emerges from the phased array antenna as a combined phase front shown in the figure at an angle θ to the line of the antenna array.

At this point we note that the present disclosure is applicable to aperiodic arrays in addition to periodic one(s). And while the phase distribution with such aperiodic configurations is not generally a linear/sawtooth phase distribution—a plane wave can nevertheless be produced. As such, discussions and analysis disclosed with respect to any saw-tooth functions are applicable to aperiodic arrays as well.

Accordingly, the direction of the phase front may be selectively controlled by varying the phase differences by appropriate differences in the phase shift control signals and focusing is made possible if the phase shifts are not equal.

Figure 2:
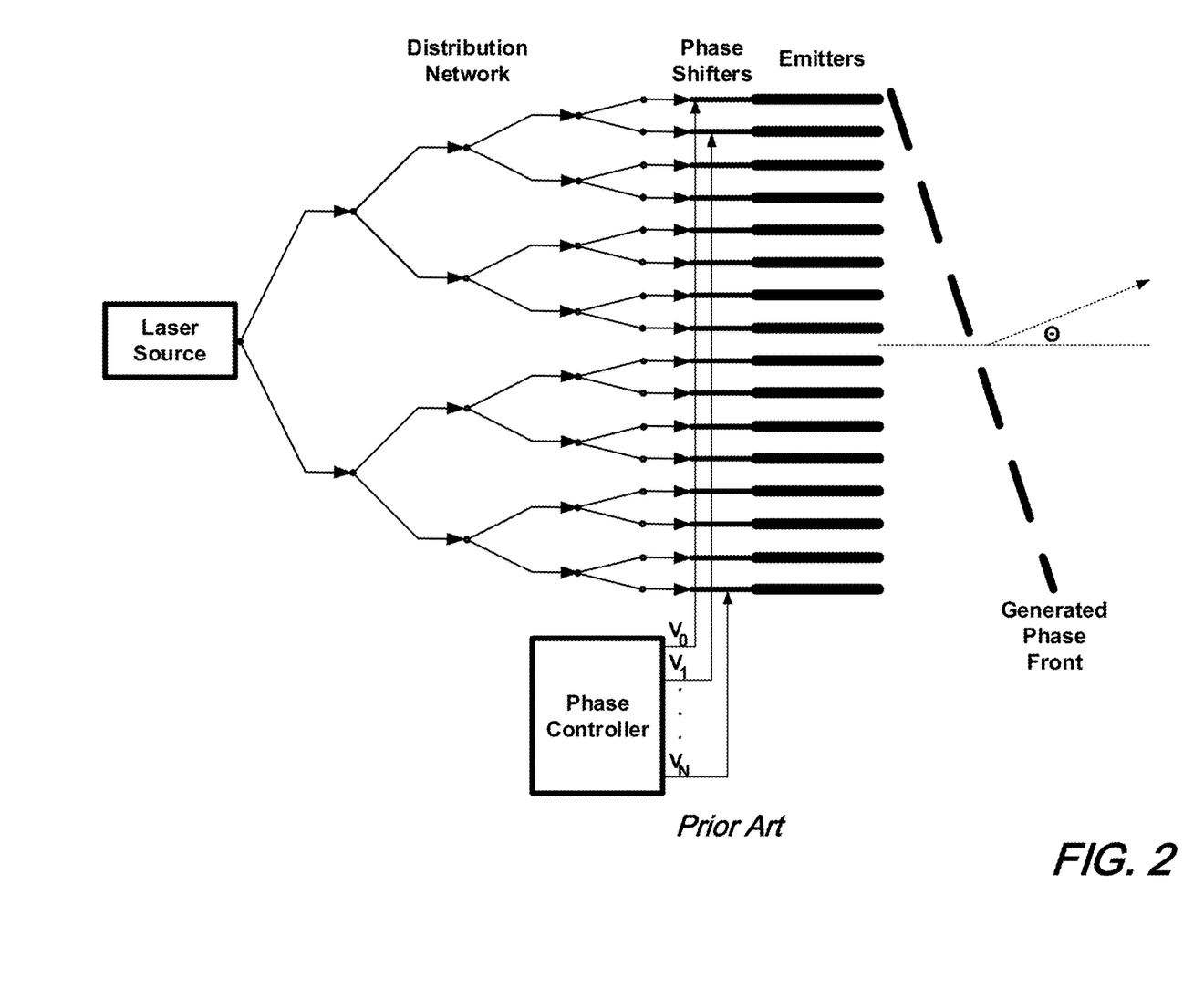
FIG. 2 is a schematic illustrating a prior-art optical phased array arrangement.

Turning now to FIG. 2, there is shown a schematic of an illustrative optical phased array arrangement as is known in the art and may be advantageously implemented on one or more semiconductor substrates using known—i.e., CMOS—fabrication techniques. As may be observed from that figure, such optical phased array arrangement includes an optical source, a distribution network, a set of individually controllable phase shifters and a like-numbered, corresponding set of emitters.

Operationally, a laser source outputs light that is received by the distribution network. As shown in the figure, the illustrative distribution network is arranged as a binary tree (or tree of m-output splitters) exhibiting a 1× N topology and may advantageously constructed from Si (or SiN) waveguides on a suitable substrate. Light received by the distribution network is fed to a set of N phase shifters and the phase shifted light is subsequently directed to N respective emitters. Each of the N individual phase shifters are controlled through the effect of a phase controller by selective—and respective—application of phase control signals $V_0, \ldots, V_N$. As described previously—and more generally—selective application of the phase control signals will produce a desired phase front that is steerable. In a preferred configuration, the emitter elements are separated from neighboring elements by less than half a wavelength, emit electromagnetic radiation (optical, microwave, etc.), and are controllably phased such that the emitted radiation combines constructively in a desired direction.

As illustrated in FIG. 2, phase control may be provided in the waveguide feed distribution network. Advantageously such phase control may be achieved based on any of a number of known effects and devices employing same including, thermo-optic, electro-optic, mechanical induced, fluidic, liquid crystal, non-linear, acousto-optic and stress-induced. As we shall show and describe, the present disclosure is concerned with phase control employing thermo-optic phase shifters.

Figure 3:
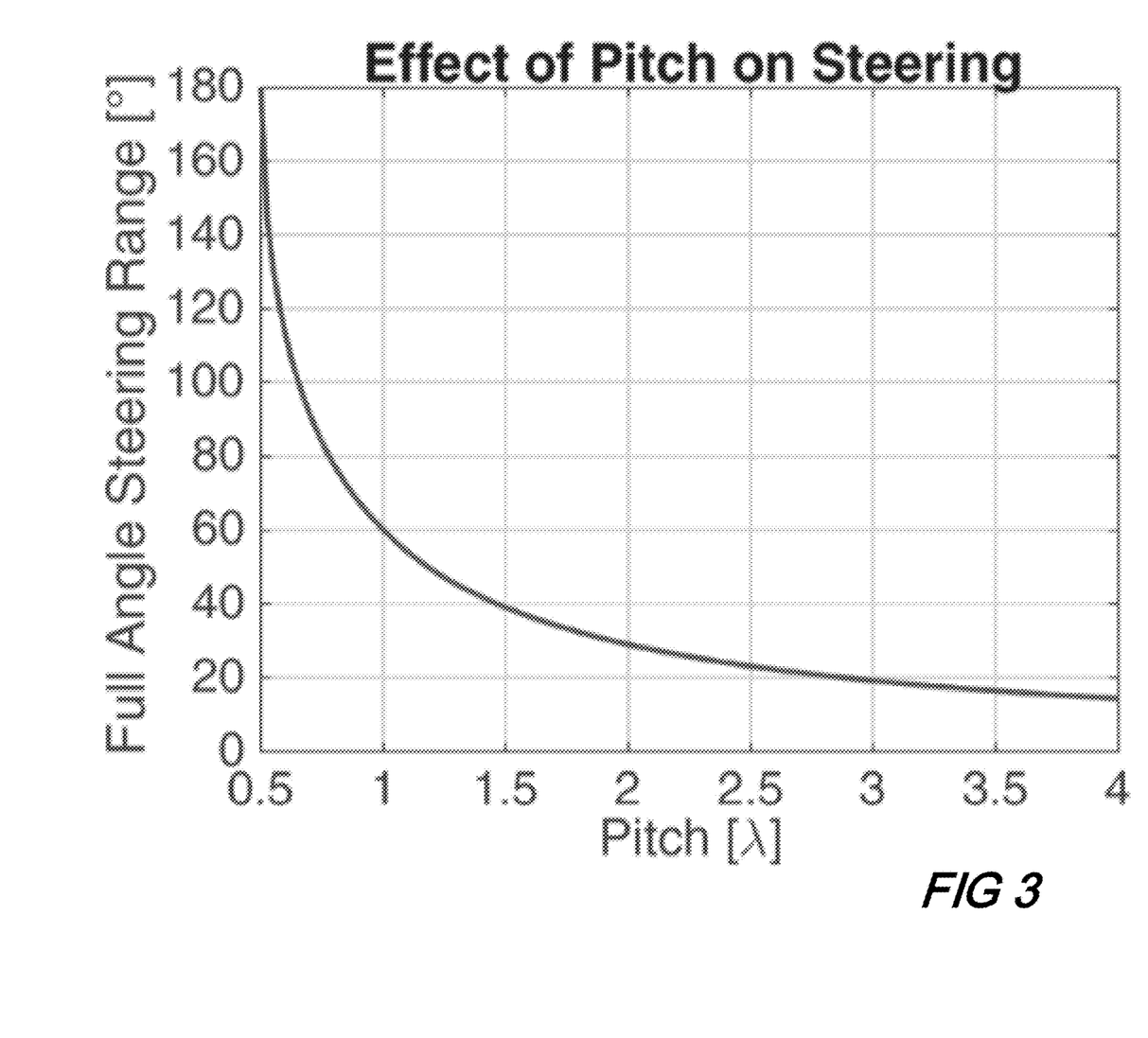
FIG. 3 is a plot of Full Angle Steering Range vs. Pitch illustrating the effect of uniform pitch on main beam steering range in an optical phased array.

With the broad, general background in place we note that if antenna elements of an optical phased array have a uniform pitch, then this uniform pitch determines the characteristic steering range of the phased array. Such steering range is which is given by:

$$\theta = 2a\sin\left(\frac{\lambda}{2d}\right)\left(\frac{180}{\pi}\right),$$

where λ is the free-space wavelength, d is the pitch of the antennas, and θ is the full steering range of the main beam in degrees. FIG. 3 is a plot of Full Angle Steering Range vs Pitch illustrating the effect of uniform pitch on main beam steering range in an optical phased array. As may be observed from that figure, when the pitch of the antenna elements is less than or equal to λ/2 then a full steering range of 180° is achieved.

Note that a λ/2 pitch translates to 775 nm for a near-infrared telecom wavelength of 1550 nm and 315 nm for visible 630 nm red light. While this pitch may be achievable for the optical antennas however, the phase shifters may unfortunately require a larger footprint. This is due—in part—to several possible reasons including the size of electrodes used, the routing of metal wires, and electrical and thermal crosstalk. Further compounding the problem, if the phase shifters of a one-dimensional optical phased array have a different pitch than the antennas, then there needs to be a routing architecture to convert between the two pitches.

As will be readily appreciated and understood by those skilled in the art, such conversion routing architectures are commonly achieved in two ways, an "S-like" architecture or a fan-out/fan-in architecture.

Figure 4:
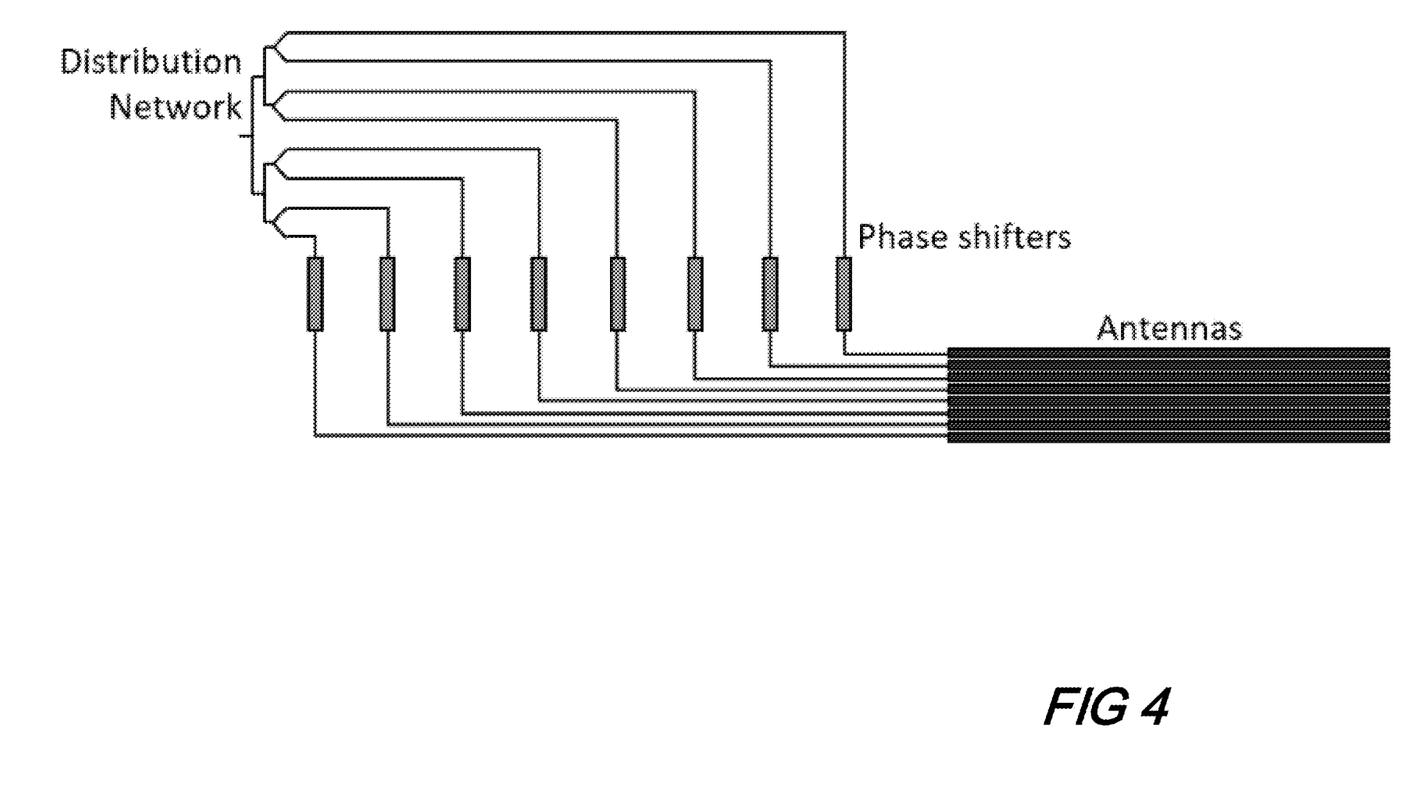
FIG. 4 is a schematic illustrating an optical phased array arrangement having an "S-like" architecture to convert between phase shifter pitch and antenna pitch.

FIG. 4 is a schematic illustrating an optical phased array arrangement having an "S-like" architecture to convert between the phase shifter pitch and antenna pitch. As may be observed from this figure, for a phased array exhibiting a large element count, this S-like routing structure occupies a large area of the overall structure footprint and lowers the aperture fill factor of the phased array. Furthermore, this limits the array aperture size that can fit on a single reticle to much lower than the reticle size. For example, if a 10 μm pitch is used between phase shifters of a 1000-element phased array, then the phase shifters take up 1 cm of space even if the actual aperture made from the antennas is only 2 mm (2 μm/1.3λ, antenna pitch for 1550 nm light). As may be appreciated, this conversion architecture greatly limits the scalability of optical phased arrays employing same and illustrates the principle that a small pitch phase shifter is needed for large-element-count arrays.

One common type of optical phase shifter used in contemporary phased arrays is the thermal phase shifter. As is known, a thermal phase shifter includes an electrical resistor that can be positioned adjacent to or within an optical waveguide. Upon application of an electrical current, electrical power dissipated in the resistor increases the temperature of the waveguide, changing its index of refraction due to the thermo-optic effect.

Unfortunately, however, in large-scale optical phased arrays having a large number of thermal phase shifters, an electrical resistor positioned adjacent or sufficiently proximate to the waveguide is undesirable. More particularly, such a resistor is commonly made from an above metal layer or an adjacent section of doped silicon. This causes the heat source resistor to be located away from the waveguide and greatly decreases the power efficiency of the heater (resistor). Additionally, since any heater positioned adjacent to the waveguide should not interfere with optical mode, it must be placed ~1 µm away from the waveguide, thereby increasing its effective footprint.

As is known, thermal phase shifting is normally employed in silicon waveguides due to its high thermo-optic coefficient but can also be used in any material having a non-zero thermo-optic coefficient. Of further advantage, silicon waveguides may also be doped with implants that allow resistors to be formed within the waveguide.

While thermal phase shifters are a relatively simple and reliable way to achieve phase shifting in silicon photonic devices, they do exhibit a relatively high-power consumption and low bandwidth as compared to other known, phase-shifting methods such as, but not limited to, carrier injection/depletion, electro-optic, and micro-electrical-mechanical systems (MEMS). As will be readily understood and appreciated by those skilled in the art, this high-power consumption becomes a major drawback for large-element-count arrays.

The power consumption needed for a certain temperature change of a system can be intuitively understood from the following relationship:

$$\Delta T = \frac{P}{G},$$

where $\Delta T$ is the temperature change of the waveguide, P is the dissipated electrical power, and G is the thermal conductance of the system.

The conductance of the system consists of two major components: the heat transfer to the silicon handle wafer and the heat transfer to the electrical contacts, both which act as large heat sinks. Therefore, G can be approximated by the two terms:

$$G = \frac{G_b(W \times L)}{d_b} F + \frac{G_{si}(W \times H)}{L} A,$$

where $G_b$ is the thermal conductivity of the material between the waveguide and the silicon handle wafer (normally silicon dioxide), W is the width of the waveguide, L is the length of the waveguide, $d_b$ is the distance between the waveguide and the silicon handle wafer, F is an empirically determined fringe factor of the heat that transfers to the silicon handle wafer (normally within 1 to 5), $G_{si}$ is the thermal conductivity of silicon, H is the height of the waveguide, and A is an empirically determined fringe factor of the heat that transfers towards the contacts. Considering both of these thermal conductivity components, silicon thermal heaters need on the order of 30 mW to achieve a $2\pi$ phase shift. In this case, a 1000-element phased array will require 30 W peak (15 W average) to steer a beam over the entire field-of-view.

As we shall show and describe, removing/undercutting silicon oxide around the thermal heater such that the waveguide is suspended in air can reduce the power consumption by effectually removing the heat transfer to the silicon handle wafer. This is due to the surrounding thermal conductivity, $G_b$, being greatly reduced and the heat being confined within the waveguide, increasing its temperature for a given electrical power level. Table 1 shows the thermal conductivities of relevant materials to thermal phase shifters.

TABLE 1

| MEDIUM | THERMAL CONDUCTIVITY [W/mK] |
|---|---|
| Air | 0.024 |
| Silicon | 148 |
| Silicon Dioxide | 1.4 |

According to aspects of the present disclosure, thermal phase shifters arranged in a one-dimensional array as part of a phased array structure are oriented at the same pitch as the antennas. Large trench(es) are utilized on groups of phase shifters to reduce the power consumption and thermal crosstalk.

As noted previously, it is crucial that the optical phase shifters are the same pitch as the antenna elements such that a pitch-converting routing architecture is unnecessary and to maintain the aperture fill factor of the array. However, having the thermal phase shifters at a tight pitch (~λ) results in thermal crosstalk between phase shifters. This crosstalk complicates beam steering any algorithms employed by making the required phase distribution of the phase shifters non-trivial. Furthermore, it increases the power consumption of the phase shifters since a phase shift greater than $2\pi$ is required to overcome the crosstalk.

According to aspects of the present disclosure, a trench is employed in which oxide adjacent and/or in an area around the phase shifters is removed. As will be readily appreciated by those skilled in the art, such oxide removal techniques are well known in the semiconductor arts and need not be restated here. Suffice to say that any of a variety of known semiconductor processing techniques/materials employed for removal of oxide and the resulting formation of a trench in the structure is consistent with aspects of the present disclosure.

Figure 5A:
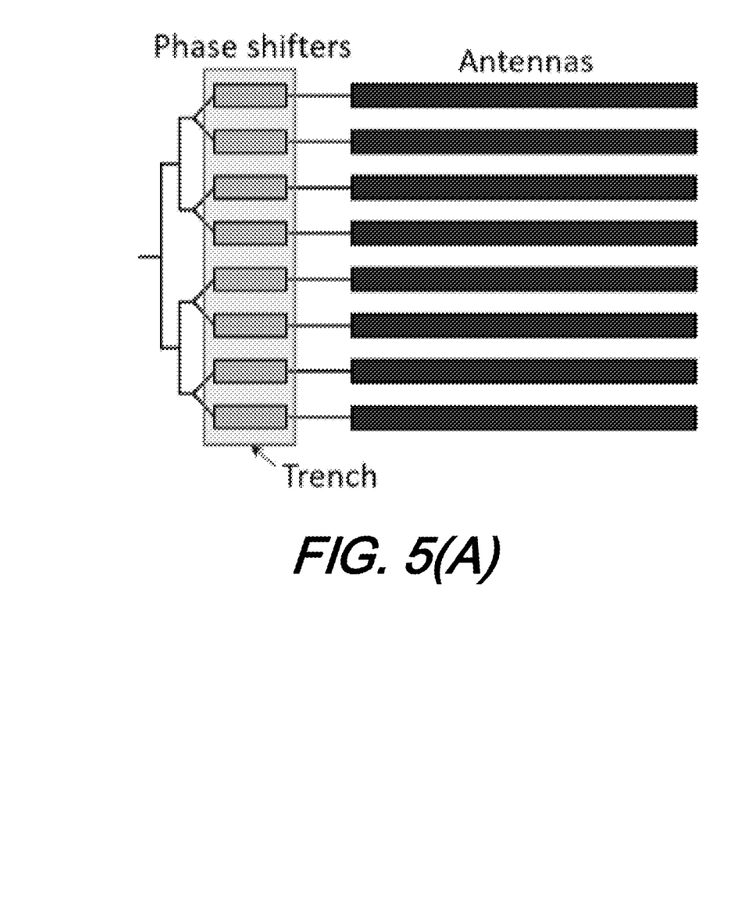
Figure 5B:
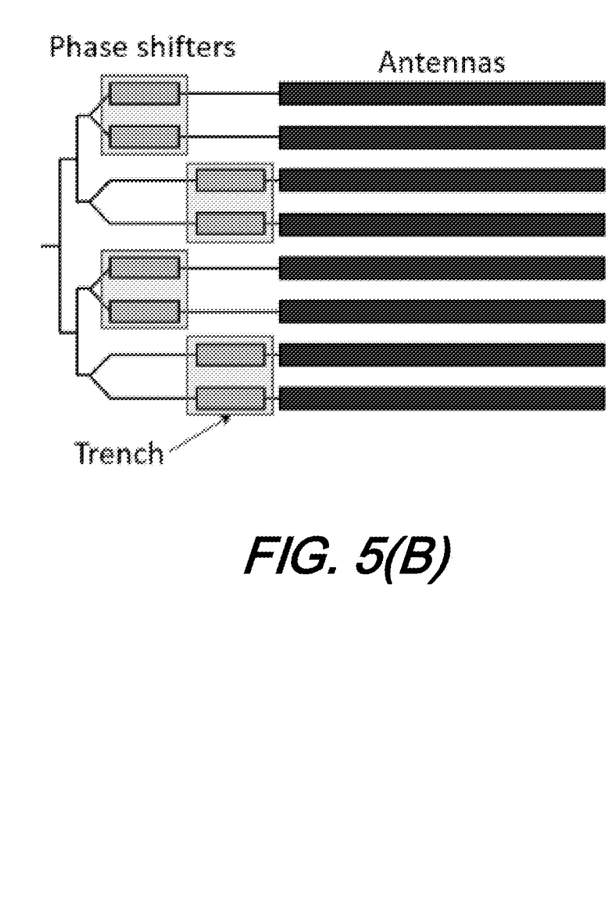

Turning now to FIG. 5(A) and FIG. 5(B) there is shown a phased array and thermal phase shifter architecture with one single trench and multiple trenches, respectively. As may be understood by those skilled in the art, when the oxide is removed by the formation of the trench, thermal crosstalk is mitigated or eliminated altogether—particularly for those arrangements having tightly pitched phase shifters—due to the reduced thermal conductivity therebetween. Of further advantage, the power required for each phase shifter to achieve $2\pi$ is reduced to ~1 mW due to the reduced heat transfer to the silicon handle wafer.

We note that a trench may be employed under multiple phase shifters such that any process design rules about a minimum trench size do not limit the pitch of the phase shifters. If there is a maximum trench size rule that does not permit the use of a single trench, then multiple trenches can be employed on groups of staggered phase shifters as shown illustratively in FIG. 5(B). By staggering groups of phase shifters, the aperture fill factor is not greatly reduced while still allowing for the trenches to cover multiple phase shifters and not limit the pitch.

Figure 5C:
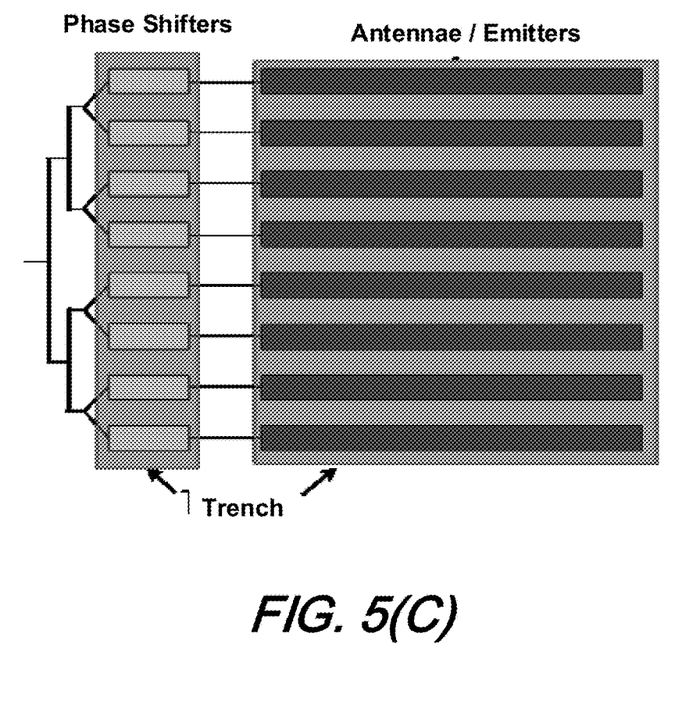
Figure 5D:
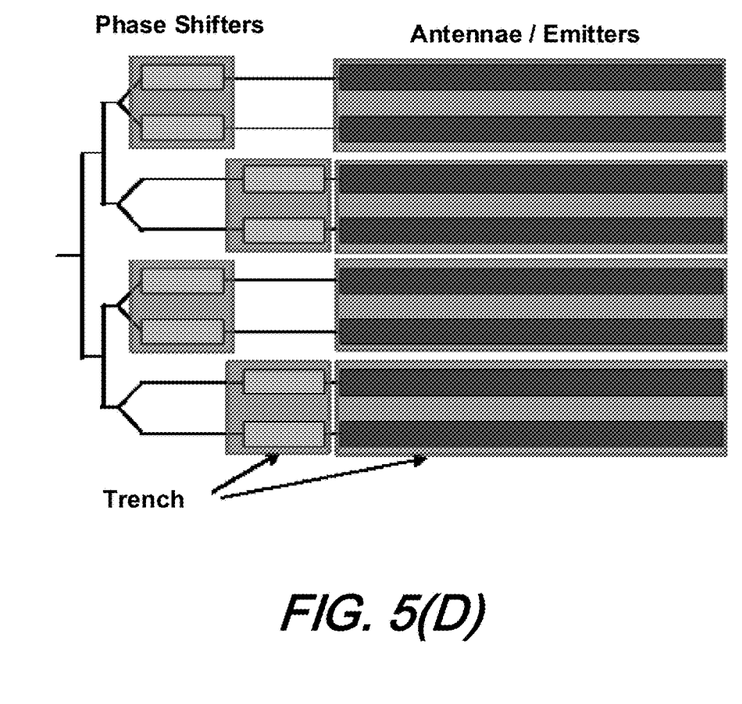
Figure 5E:
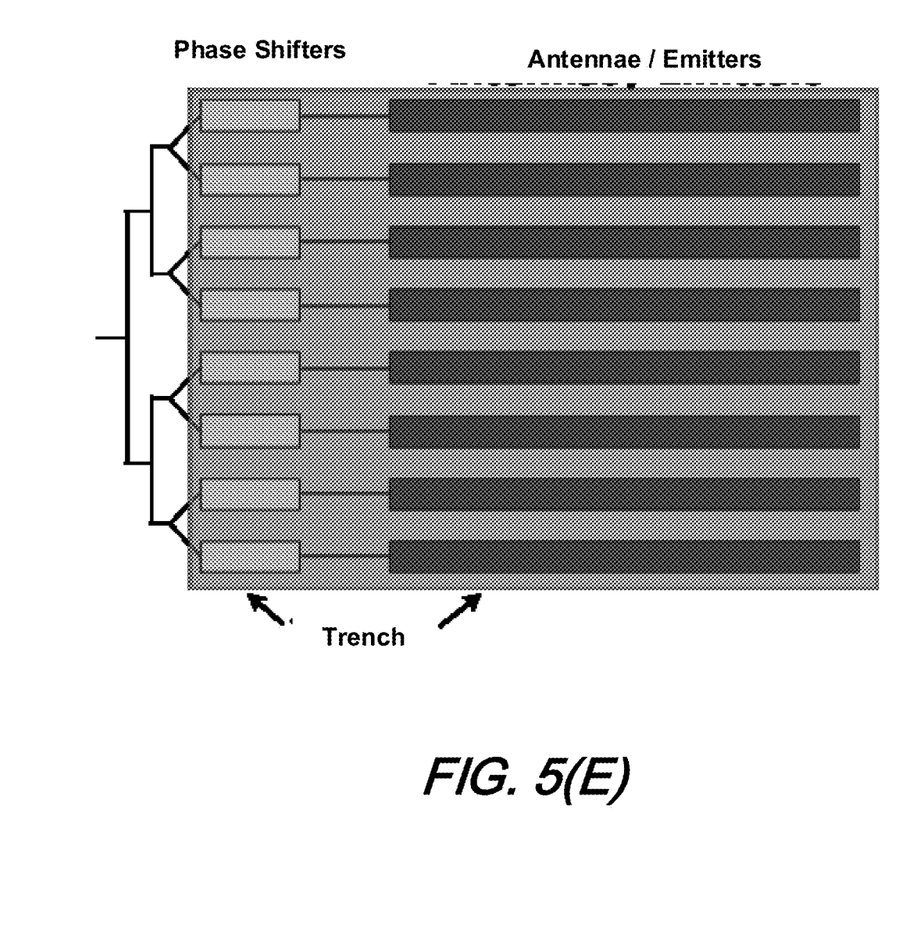

Similarly, one or more trenches may be formed under and/or around emitter/antennas that comprise an optical phased array. As shown in FIG. 5(C), and FIG. 5(D), the trench(es) may be a single one formed with respect to an entire array of emitters. Alternatively, a plurality of trenches may be employed that are formed respective to one or more of the emitters in a manner similar to that for the phase shifters previously described. Finally, we note that the figures are merely illustrative of the principles of the present disclosure, and therefore various combinations of trenches/phase shifters and trenches/emitters are contemplated by this disclosure.

Figure 6A:
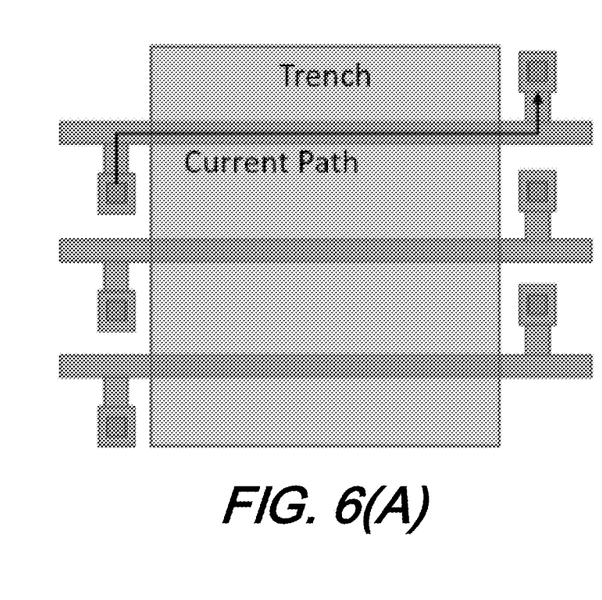

Note further that since phase shifters are embedded within the waveguide, they are electrically contacted on a side of the waveguide outside of the trench as illustratively shown in FIG. 6(A). Stated alternatively—the trench does not need to underlie the electrical contacts of an individual phase shifter. Advantageously, such a contact structure can be created with, but not limited to, an adiabatic bend, partial etch ridge waveguide, or just a naïve perturbation of a strip waveguide.

When an electrical voltage is applied between two electrical contacts of an individual phase shifter positioned within a waveguide according to the present disclosure, current travels through the waveguide thereby generating heat within the waveguide, as the current flows towards the other contact. Note that the contact structure illustratively shown in FIG. 6(A) is the only part of the phase shifter that limits the pitch. Notwithstanding this limitation, a phased array structure exhibiting such contact structure can still be implemented to be $\sim\lambda/2$ which is required for a full 180° phased array steering.

Figure 6B:
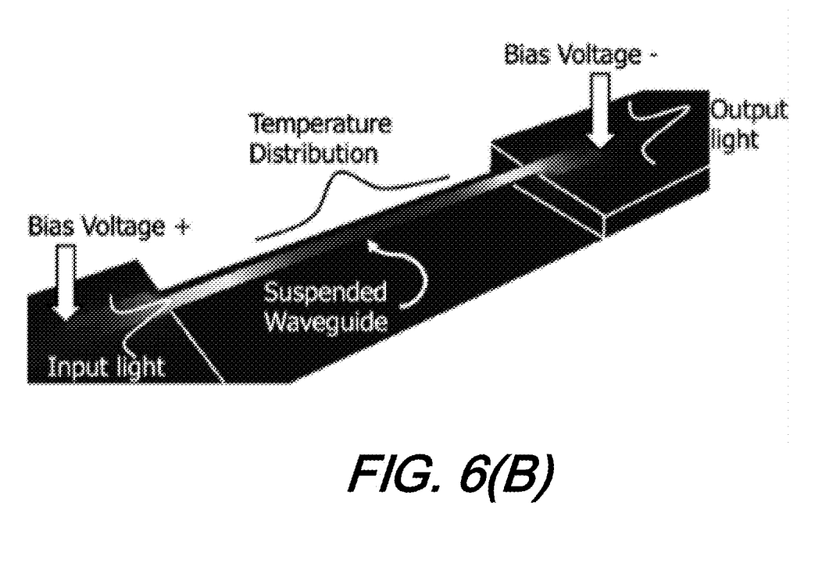

With specific reference now to FIG. 6(B) which illustrates a thermal simulation of a single suspended waveguide, due to the formation of the trench resulting in the removal of oxide around the waveguide, heat generated by a thermal phase shifter within the waveguide is substantially confined to the center of the waveguide, as shown in the thermal simulation. Advantageously, and according to a further aspect of the present disclosure, if it is desired and/or necessary to generate heat even more localized in the center of the waveguide, the electrical resistivity of the waveguide may be altered to be greater in the center by selectively using dopants at a lower concentration thereby creating a doping resistivity cross sectional profile in the waveguide or physically tapering down (narrowing) the waveguide width in the central portion. Still another alternative is a combination of physical tapering and using dopants to generate a desired cross sectional resistivity profile in the waveguide such that this combination produces a desired heating at particular location(s) of the waveguide.

As may now be readily understood and appreciated, by forming a trench underneath and/or around the phase shifters—or waveguides including phase shifters—these structures are effectively thermally isolated from one another. In effect, a thermal insulative "air gap" is formed substantially underneath and/or around and/or between these structures.

Figure 7:
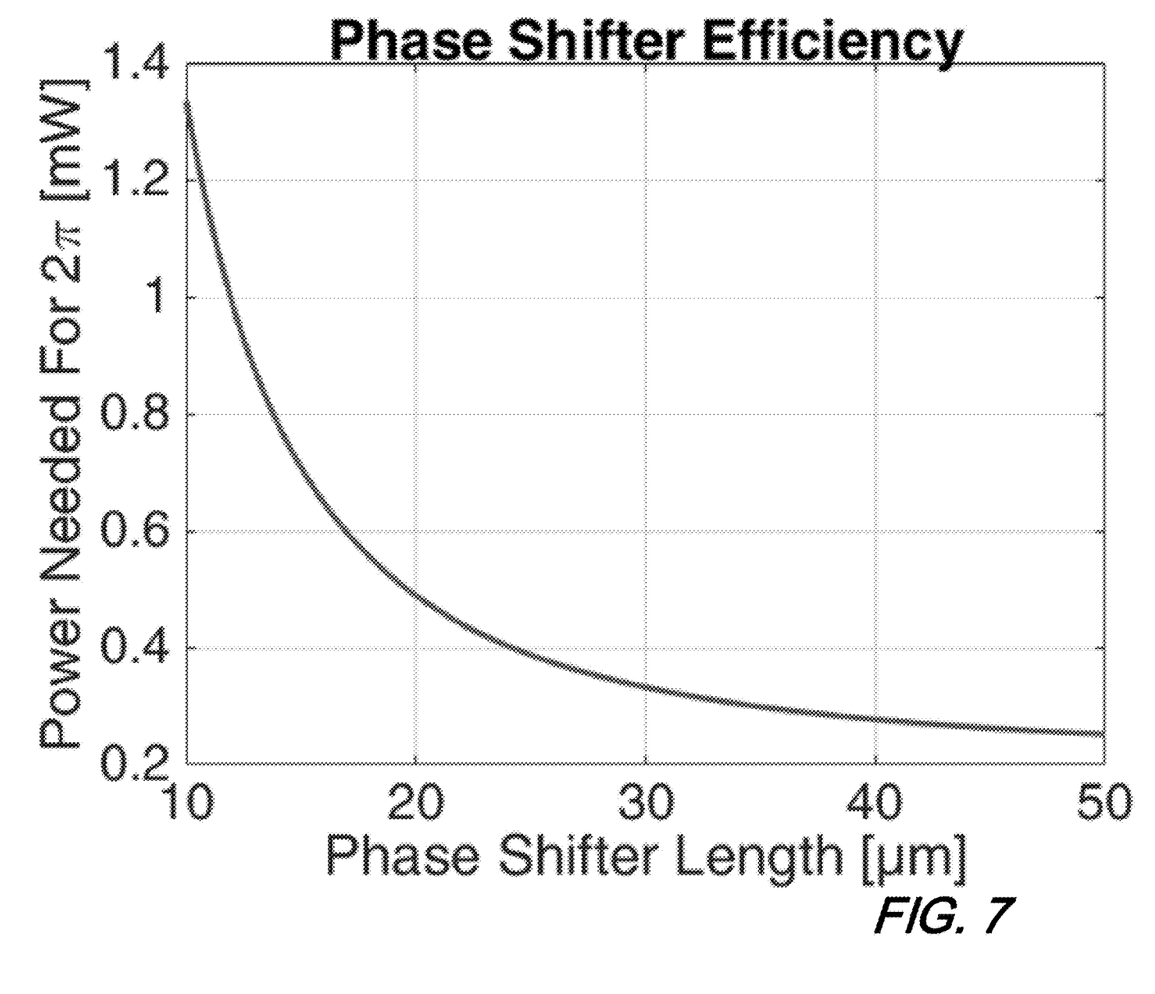
FIG. 7 is a plot showing Power Needed for $2\pi$ vs. Phase Shifter Length for the electrical power needed to achieve a $2\pi$ phase shifter in a suspended heater according to aspects of the present disclosure.

In the suspended waveguide arrangement, any heat transfer to the silicon handle wafer is almost eliminated and the heat transferred to the electrical contacts is the major component of the system thermal conductivity (the second term of G). A longer thermal heater will result in a higher efficiency as may be observed from inspection of FIG. 7—which shows a plot of Power needed for $2\pi$ vs. Phase Shifter Length for a suspended waveguide. As may be observed from that figure—at a certain length—the thermal conductivity due to the heat transfer to the silicon handle wafer is the only component of the system thermal conductivity (the first term of G) and minimal gains are made by increasing the heater length.

Figure 8A:
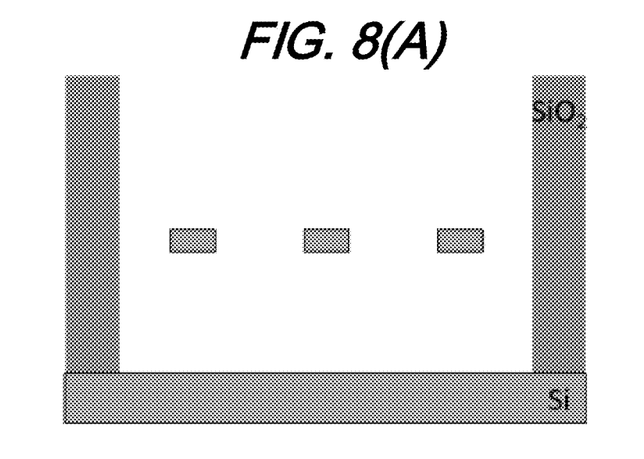
Figure 8B:
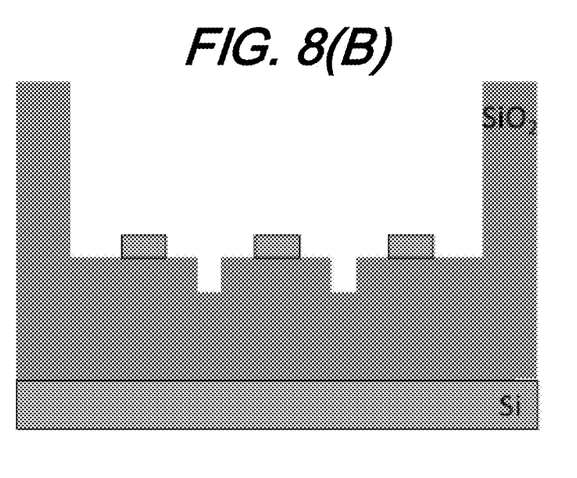
Figure 8C:
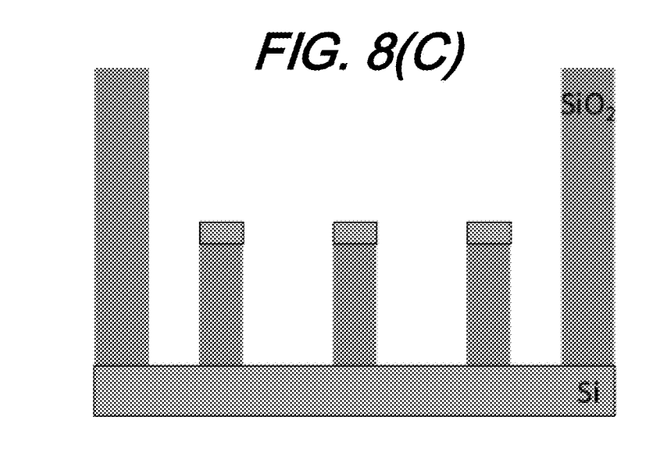

FIG. 8(A), FIG. 8(B), and FIG. 8(C) are schematic diagrams showing illustrative scenarios of how a trench could interact with oxide around waveguides for: FIG. 8(A)—fully suspended waveguides; FIG. 8(B)—top oxide etched; and FIG. 8(C)—waveguides with oxide pedestals; all according to aspects of the present disclosure. As may be appreciated by those skilled in the art, a trench according to the present disclosure can be formed/configured in a number of ways such as, but not limited to, those shown in the figures.

For example—with respect to thermal isolation—completely suspended waveguides theoretically provide the greatest thermal isolation between phase shifters and provide the greatest reduction in power needed to achieve a $2\pi$ phase shift. However, such completely suspended waveguides have the risk of bending or breaking due to strain and shock.

At this point we note that complete thermal isolation is difficult to achieve—even with structures, architectures, and configurations according to the present disclosure. Accordingly, a more accurate description of what is provided by aspects of the present disclosure is a sufficient degree of thermal insulation—the reduction of heat transfer (i.e., the transfer of thermal energy between objects/elements of differing temperature) between objects/elements in thermal contact or in range of radiative influence. As should be apparent to those skilled in the art, thermal insulation is achieved according to an aspect of the present disclosure by employing trenches in selective locations within an optical phased array structure. Since heat flow is an inevitable consequence of contact between objects/elements of different temperature, thermal insulation—provided by selective trenching—provides regions of insulation in which thermal conduction is reduced.

Importantly, thermal insulation achieved according to aspects of the present disclosure mitigate any thermal crosstalk between phase shifters and/or emitters in an optical phased array while further enhancing its controllability.

Finally, at this point we note that in addition to providing a degree of thermal insulation, structures, architectures, and configurations according to the present disclosure advantageously provide an amount of optical isolation between elements and in particular optical isolation between phase shifters and optical isolation between emitters/antennae.

In order to mitigate the mechanical stability issue noted previously, it is possible to only remove the top oxide overlying the waveguide and/or phase shifter such as that shown in FIG. 8(B)—which will reduce the thermal crosstalk between the waveguides and/or phase shifters and reduce the contact fringe factor, A.

Alternatively, a pedestal of oxide could be left below the waveguide as illustratively shown in FIG. 8(C). This configuration advantageously eliminates thermal crosstalk between the waveguides and/or phase shifters and increases the heater efficiency by effectively making the silicon handle wafer fringe factor, F, be 1.

Figure 9:
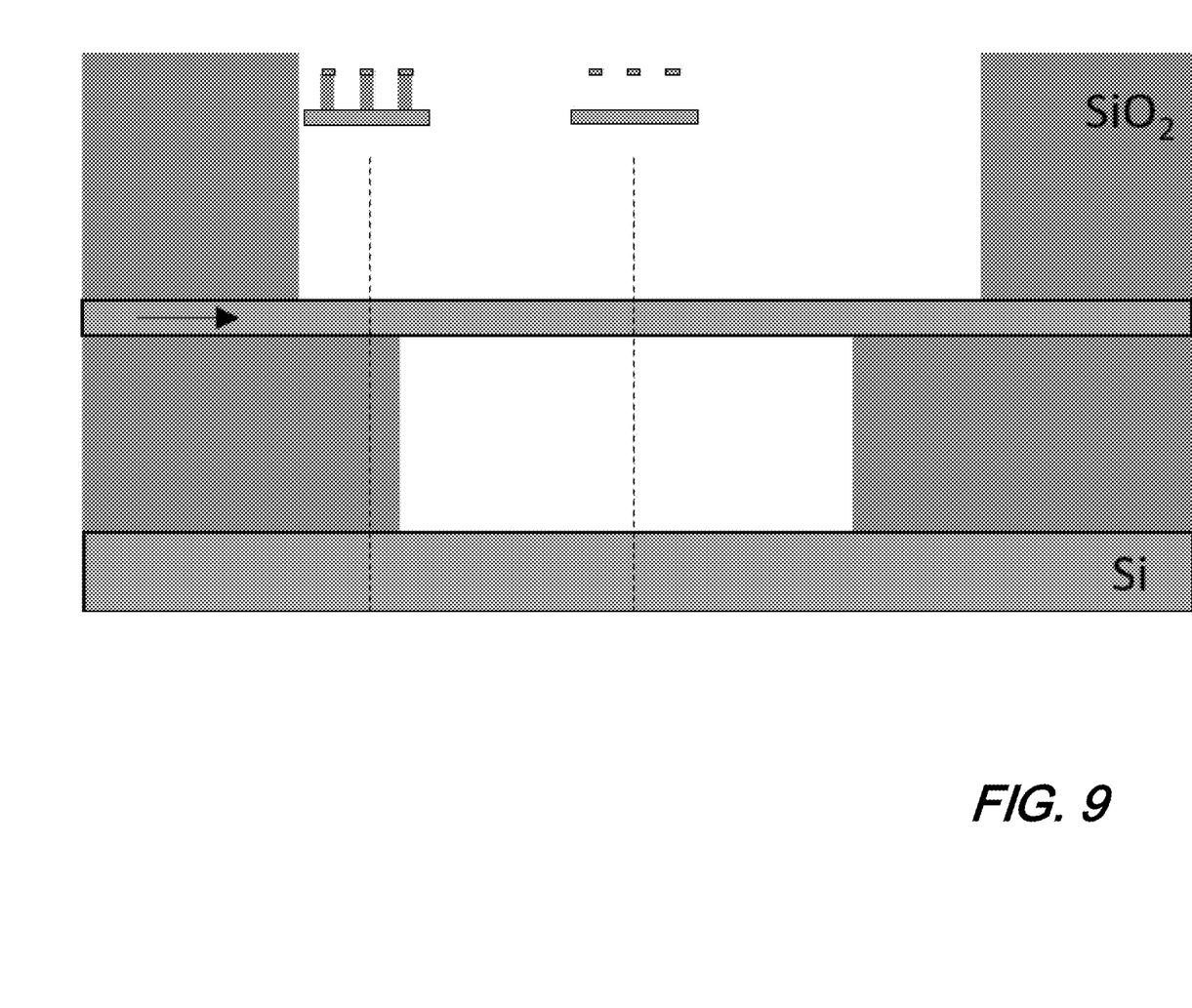
FIG. 9 is a schematic showing an illustrative non-uniform trench geometry according to aspects of the present disclosure.

Finally, we note that a trench according to the present disclosure does not need to act uniformly on the surrounding oxide and can be altered along the waveguide. Example purposes of this are, but not limited to, optimizing power efficiency and mechanical stability or engineering the heat flow. An example non-uniform trench is shown illustratively in FIG. 9. Such a trench would force any heat flowing from the center of the waveguide down into the silicon handle wafer before reaching region where there is no trench and producing crosstalk between adjacent phase shifters.

At this point, while we have presented this disclosure using some specific examples, those skilled in the art will recognize that our teachings are not so limited. In particular—and as we have previously noted—the disclosure is applicable to any waveguide/phase shifter structures that are integrated into a single substrate and air gaps resulting from trenches selectively formed under and/or around the waveguide/phase shifters provide sufficient thermal isolation between the waveguide/phase shifter structures such that thermal crosstalk is mitigated or eliminated. Accordingly, this disclosure should be only limited by the scope of the claims attached hereto.

The invention claimed is:

1. An optical phased array structure comprising: a plurality of optical emitters in optical communication with a plurality of optical phase shifters,
wherein
each individual one of the plurality of optical phase shifters is thermally insulated from one another by one or more trenches formed in the structure, wherein each individual trench underlies more than one of the phase shifters; and
the plurality of optical phase shifters exhibit a pitch that is smaller than three times a wavelength of light that the structure is configured to emit.

2. The optical phased array structure of claim 1 wherein:
the plurality of optical phase shifters exhibit substantially the same pitch as the plurality of optical emitters.

3. The optical phased array structure of claim 1 wherein:
the structure includes a single trench that underlies all of the individual phase shifters in the plurality of phase shifters.

4. The optical phased array structure of claim 3 wherein:
the structure includes a second trench that underlies all of the individual emitters in the plurality of emitters.

5. The optical phase array structure of claim 3 wherein:
the single trench underlies all of the individual emitters in the plurality of emitters.

6. The optical phased array structure of claim 1 wherein:
the phase shifters are arranged in groups of multiple individual phase shifters, each phase shifter group having a single trench associated with the phase shifter group that underlies the phase shifter group.

7. The optical phased array structure of claim 6 wherein:
the plurality of emitters are arranged in groups of multiple individual emitters, each emitter group having a single trench associated with the emitter group that underlies the emitter group, each emitter group associated with a single phase shifter group, and each emitter group having the same number of individual emitters as its associated phase shifter group has phase shifters.

8. An optical phased array structure comprising:
a plurality of optical emitters/antennae;
a plurality of waveguides, each individual one of the plurality of waveguides optically coupled to a respective one of the plurality of optical emitters/antennae, each of the individual waveguides have an individual thermal phase shifter associated with the individual waveguide;
wherein at least a portion of each individual waveguide is positioned adjacent to a trench formed in the structure, wherein each trench underlies more than one of the individual waveguides; and
wherein the optical phase shifters exhibit a pitch that is smaller than three times a wavelength of light that the structure is configured to emit.

9. The optical phased array structure according to claim 8 wherein the individual thermal phase shifter associated with the individual waveguide is formed within the waveguide.

10. The optical phased array structure according to claim 9 wherein heat generated in the thermal phase shifter is substantially confined to a central portion of that phase shifter.

11. The optical phased array structure according to claim 9 wherein the thermal phase shifter is configured to exhibit an electrical resistance that varies along its length.

12. The optical phased array structure according to claim 9 wherein the thermal phase shifter exhibits a width that varies along its length such that it is narrowest at substantially its center.

13. The optical phase array structure according to claim 9 wherein the thermal phase shifter exhibits a doping resistivity cross sectional profile configured such that the suspended portion exhibits a maximum electrical resistance at a desired position of the waveguide.

14. The optical phased array structure according to claim 8 wherein at least a portion of each individual waveguide is a suspended waveguide.

15. The optical phased array structure according to claim 8 wherein heat generated in the waveguide through the effect of one of the phase shifters is substantially confined to a central portion.

16. The optical phased array structure according to claim 15 wherein the waveguide is configured to exhibit an electrical resistance that varies along its length.

17. The optical phased array structure according to claim 15 wherein the waveguide exhibits a width that varies along its length such that it is narrowest at substantially its center.

18. The optical phase array structure according to claim 15 wherein the waveguide exhibits a doping resistivity cross sectional profile configured such that the waveguide exhibits a desired maxi mum electrical resistance at a desired position of the waveguide.

19. The optical phased array structure according to claim 8 wherein at least one trench formed in the structure exhibits a geometry that varies along its length.

20. The optical phased array structure of claim 8 that has a single trench configured such that the single trench underlies the entire plurality of waveguides.

21. The optical phase array structure of claim 8 wherein the plurality of waveguides are arranged in groups of a plurality of individual waveguides, each group having a single trench associated with the group that underlies the group.

22. The optical phased array structure of claim 8 wherein the plurality of optical emitters/antennae and the plurality of waveguides exhibit substantially the same wavelength scale pitch.

23. An optical phased array structure comprising: a plurality of optical emitters in optical communication with a plurality of optical phase shifters, wherein
each individual one of the plurality of optical emitters is thermally insulated and optically isolated from one another by one or more trenches formed in the structure, wherein each individual trench underlies more than one of the optical emitters; and the plurality of optical phase shifters exhibit a pitch that is smaller than three times a wavelength of light that the structure is configured to emit.

24. The optical phased array structure of claim 23 wherein:

the structure includes a single trench that underlies all of the individual emitters in the plurality of emitters.

25. The optical phased array structure of claim 24 wherein:

the plurality of emitters and the plurality of optical phase shifters exhibit substantially the same wavelength-scale pitch.

* * * * *

UNITED STATES PATENT AND TRADEMARK OFFICE
CERTIFICATE OF CORRECTION

| | | |
|---|---|---|
| PATENT NO. | : 10,527,906 B2 | Page 1 of 1 |
| APPLICATION NO. | : 15/883012 | |
| DATED | : January 7, 2020 | |
| INVENTOR(S) | : Christopher Poulton et al. | |

It is certified that error appears in the above-identified patent and that said Letters Patent is hereby corrected as shown below:

In the Specification

At Column 1, Line number 12, before the "TECHNICAL FIELD", please insert the following paragraph:
--STATEMENT AS TO FEDERALLY SPONSORED RESEARCH
This invention was made with government support under contract no. HR0011-16-C-0108 awarded by DARPA. The government has certain rights in the invention.--

Signed and Sealed this
Sixth Day of June, 2023

Katherine Kelly Vidal
*Director of the United States Patent and Trademark Office*